United States Patent

Uejikkoku et al.

[11] Patent Number: 5,110,842
[45] Date of Patent: May 5, 1992

[54] ELECTRON-BEAM CURED SHEET-TYPE FOAM

[75] Inventors: Nario Uejikkoku; Masashi Takeda, both of Shiga, Japan

[73] Assignee: Toray Industries, Inc., Tokyo, Japan

[21] Appl. No.: 598,646

[22] PCT Filed: May 14, 1990

[86] PCT No.: PCT/JP90/00612
§ 371 Date: Oct. 22, 1990
§ 102(e) Date: Oct. 22, 1990

[87] PCT Pub. No.: WO90/14385
PCT Pub. Date: Nov. 29, 1990

[30] Foreign Application Priority Data

May 16, 1989 [JP] Japan ................................ 1-123773

[51] Int. Cl.$^5$ .............................................. C08J 9/14
[52] U.S. Cl. ............................... 521/134; 521/50.5;
521/94; 521/95; 521/1140; 521/915; 523/217;
525/192; 525/193; 525/194; 525/221; 525/222;
525/227; 525/232; 525/240

[58] Field of Search ............ 521/134, 140, 915, 50.5;
523/217; 525/192, 193, 194, 221, 222, 227, 240, 232

[56] References Cited

FOREIGN PATENT DOCUMENTS 62-34930 2/1987 Japan .
63-159447 7/1988 Japan .

*Primary Examiner*—Morton Foelak
*Attorney, Agent, or Firm*—Armstrong, Nikaido, Marmelstein, Kubovcik & Murray

[57] ABSTRACT

An electron-beam cured sheet-type foam comprises: a polypropylene type resin (A) of 100 parts by weight of which main component is polypropylene; a copolymer resin (B) of 5 to 40 parts by weight which is made of ethylene and at least one selected from the group consisting of acrylic acid, ethylacrylate maleic acid anhydride and vinylacetate; and a copolymer resin (C) made of ethylene and an α-olefin of 4 to 8 carbon atoms, having a melting point of 117° C. to 123° C. and a density of 0.890 g/cm$^3$ to 0.910 g/cm$^3$. This foam contains 20 to 60 percent in gel content and has an expansion ratio of 5 to 40.

10 Claims, No Drawings

ELECTRON-BEAM CURED SHEET-TYPE FOAM

TECHNICAL FIELD

The present invention relates to a foam, and more particularly to a sheet-type foam which is cured by an electron beam.

BACKGROUND ART

Electron-beam cured foams have been used as cushioning materials in automobile interiors, and a heat-resisting and heat-insulating materials.

Japanese Patent Laying-Open No. 265935/1988 discloses a cured foam consisting of an olefin resin comprising linear very-low-density polyethylene of more than 10 wt. %. The linear very-low-density polyethylene is made by copolymerizing ethylene with an α-olefin having more than 4 carbons. According to the disclosure, the olefin resin may be a polymer made from olefin monomers, such as polypropylene, or a copolymer mixture of ethylene/ethylacrylate. The linear very-low-density polyethylene may be composed by a process in which ethylene is copolymerized with an α-olefin having more than 4 carbons, such as butene-1, hexene-1, octene-1, 4-methylpentene-1, in order to add an appropriate number of short branches to the main linear chains, whereby the density is decreased.

The above document further discloses the following example. Ethylene/propylene random copolymer of 35 parts by weight having density of 0.89 g/cm$^3$, Melt Index of 7.0 g/10 min, and melting point of 145° C.; high-density polyethylene of 30 parts by weight having density of 0.957 g/cm$^3$ and MI of 6.5 g/10 min; linear very-low-density ethylene/4-methylpentene-1 copolymer of 35 parts by weight having density of 0.905 g/cm$^3$ and MI of 0.0 g/10 min; azodicarbonamide, as a foaming agent, of 15 parts by weight; trimethylpropane-trimethacrylate of 3.0 parts by weight; and a heat stabilizer of 0.5 parts by weight were mixed. The mixture was formed into a sheet of 1.5 mm thickness by an extruder. In order to cross-link the sheet, both surfaces were irradiated by an electron beam of 2.0 Mrad in an electron-beam irradiation apparatus. The sheet was then uniformly transported through a hot air stove at 250° C. for heat foaming, whereby a sheet-type foam of about 4 mm in thickness was obtained.

The obtained cross-linked foam is of inferior tensile strength and dimensional stability, although it has good flexibility. That is, a foam produced in direct accordance with the technology disclosed in Japanese Patent Laying-Open No. 265935/1988 results in insufficient tensile strength and insufficient dimensional stability, due to inappropriateness in the selection of resins and the mixing ratio.

Additionally, Japanese Patent Laying-Open No. 155232/1981 and Japanese Patent Laying-Open No. 157839/1983 disclose a resin made of a copolymer of ethylene of which melting point ranges from 117° C. to 123° C. and density ranges from 0.890 g/cm$^3$ to 0.910 g/cm$^3$, and an α-olefin having 4 to 8 carbons. However, this resin is not comprised of 3 components, as in the above example from the prior art.

SUMMARY OF THE INVENTION

It is an object of the present invention to provide an electro-beam cured sheet-type foam of improved tensile strength and dimensional stability.

It is another object of the present invention to provide an electron-beam cured sheet-type foam of improved tensile strength, dimensional stability and flexibility.

It is yet another object of the present invention to provide an electron-beam cured sheet-type foam of improved tensile strength at high temperatures and increased processability in molding wherein the foam is used in a composite material.

It is a further object of the present invention to provide an electron-beam cured sheet-type foam of improved dimensional stability whereby it may be more suitably used as a cushioning material in the automobile interiors.

It is yet another object of the present invention to provide an electron-beam cured sheet-type foam of improved tensile strength at high temperatures whereby it may be more suitably used as a heat-resisting and heat-insulating foamed material.

According to one aspect of the present invention, an electron-beam cured sheet-type foam comprises a polypropylene type resin (A) of 100 parts by weight of which main component is propylene; a copolymer resin (B) of 5 to 40 parts by weight, composed of ethylene and at least one selected from the group consisting of acrylic acid, ethylacrylate, maleic acid anhydride and vinylacetate; and a copolymer resin (C) of 10 to 80 parts by weight ethylene, of which melting point ranges from 117° C. to 123° C. and density ranges from 0.890 g/cm$^3$ to 0.910 g/cm$^3$, and an α-olefin having 4 to 8 carbons. This foam ranges from 20 to 60% in gel percent and from 5 to 40 in expansion ratio.

This foam may preferably be 50 kg/cm$^2$.% or more in tensile strength at 150° C., and 5% or less in size-change ratio at 120° C., or size stability.

DETAILED DESCRIPTION OF THE INVENTION

The inventors have found that a foam of improved flexibility, tensile strength, dimensional stability, and processability in molding may be obtained by mixing the resins (A), (B) and (C) in a proper ratio, and by electron-beam curing prior to foaming.

COMPONENT

A polypropylene type resin (A) comprising propylene for use in a foam according to the present invention is, for example, a propylene homo-polymer; or a random copolymer, block copolymer or random/block copolymer of propylene, and at least one selected from the group consisting of ethylene and butane. The amount of ethylene and/or butene-1 in the copolymer may range from 2 to 35 weight percent, preferably from 3 to 30 weight percent. More preferably, the copolymer may be a random copolymer including ethylene of 4 to 15 weight percent.

The copolymer resin (B) may include ethylene and at least one compound of 5 to 30 weight percent (preferably, 8 to 25 weight percent) selected from the group consisting of acrylic acid, ethylacrylate, maleic acid anhydride and vinylacetate. More preferably, the copolymer (B) may be ethylene-ethylacrylate (EEA) comprising ethylacrylate of 8 to 18 percent, or a three-component copolymer of ethylene/ethylacrylate/maleic-acid-anhydride (EEA-MAH), including ethylacrylate and maleic acid anhydride of 8 to 18 weight percent in total.

The copolymer resin (C) of ethylene and α-olefin having 4 to 8 carbons ranges from 117° to 123° C. in melting point, and from 0.890 to 0.910 g/cm$^3$ in density. Preferably, the copolymer (C) may include an α-olefin having 4 to 6 carbons, and may range from 117° to 123° C. in melting point and from 0.895 to 0.905 g/cm$^3$ in density. The copolymer (C) of ethylene and α-olefin may be an ethylene/α-olefin copolymer as disclosed in Japanese Patent Laying-Open No. 157839/1983. There is a proportion between the density and the melting point of the copolymer, wherein the melting point increases as the density increases; but some physical characteristics of the resin, such as melting point, tensile strength, expansibility and flexibility, can be changed under a constant density, by using a different catalyst or a different mixing method. The copolymer (C) in the foam according to the present invention is different from the linear very-low-density polyethylene as described in Japanese Patent Laying-Open No. 265935/1988, viz., Ultzex (Mitsui Petrochemical Industries Ltd.) and Excelen (Sumitomo Chemical Co., Ltd.). For example, at density ranging from 0.890 to 0.910 g/cm$^3$, the polyethylene used in Japanese Patent Laying-Open No. 265935/1988 has a melting point 4° to 7° C. lower than that used in the present invention. The lower melting point deteriorates the dimensional stability of the foam. At the same time the polyethylene used in the present invention has a higher melting point at low density, providing good flexibility and low size-change rate at 120° C.

According to the present invention, the mixing ratio of resin components (A), (B) and (C) is defined as follows: the component (A) is 100 parts by weight, the component (B) is 5 to 40 parts by weight (preferably, 5 to 25 parts by weight), and the component (C) is 10 to 80 parts by weight (preferably, 20 to 50 parts by weight). If the proportion of the component (B) is more than 40 parts by weight, the size stability (size-change rate at 120° C.) of the obtained foam becomes more than 5 percent. If the proportion of component (B) is lower than 5 parts by weight, the obtained foam cannot satisfy the required levels of flexibility, heat resistance, tensile strength and molding processability. Particularly, the obtained foam lacks sufficient tensile strength at high temperatures. Moreover, if the proportion of the component (B) is lower than 5 parts by weight, the obtained foam has the same characteristics as those of a foam made from a mixture of the components (A) and (C). If a foam contains an excess of the component (A), the obtained foam lacks sufficiently high flexibility, although it has high shock resistance and dimensional stability. If a foam contains an excess of the component (C), the obtained foam has inferior heat resistance, although it has high flexibility. If the proportion of the component (C) is less than 10 parts by weight, the flexibility of the obtained foam deteriorates. Moreover, if the proportion of the component (C) is more than 80 parts by weight, the size stability deteriorates, although good flexibility may be obtained.

GEL PERCENT AND EXPANSION RATE

According to the present invention, the foam ranges from 20 to 60 percent in gel percent and from 5 to 40 in expansion rate.

If the gel percent is lower than 20 percent, the dimensional stability of the obtained foam deteriorates due to gel shortage. Furthermore, the predetermined density cannot be obtained and the formed surfaces of the foam are rough, due to the fact that a gas is generated inside the foam during production which disrupts the surfaces. Moreover, sufficient tensile strength at high temperatures cannot be obtained. If the gel percent is more than 60 percent, the obtained foam tends too strongly to retain its shape resulting in greater than 5 percent of dimensional stability (size-change rate at 120° C.). The flexibility also deteriorates.

The expansion ratio must range from 5 to 40. If the expansion ratio is lower than 5, the flexibility deteriorates inasmuch as the foam becomes too hard, although the tensile strength and the molding processability remain sufficient. If the expansion rate is more than 40, the shock-absorbing ability deteriorates inasmuch as the obtained foam becomes too soft, although the flexibility remains sufficient.

TENSILE STRENGTH

According to the present invention, the foam may be 50 kg/cm$^2$.% or more in tensile strength at 150° C. If the tensile strength is lower than 50 kg/cm$^2$.%, the obtained foam becomes ruptured, because the tensile strength of the foam is not sufficient at high temperatures to correspond with the expansion and the expansion stress of the facing material (such as a sheet of vinylchloride), when the foam is heat-processed after being laminated with the facing material.

Cured foams made of conventional resin proportions have a problem in that only a few kinds of facing material may be used in a heat molding process due to the low expansion stress of the foams. However, foam according to the present invention has 50 kg/cm$^2$.% or more in tensile strength, so that it is superior to conventional foams. Foam according to the present invention is of improved tensile strength at high temperatures, whereby less disuniformity in thickness of product occurs, and heat-molding processability is improved. The molding processability (L/D) can be expanded to 1.2.

DIMENSIONAL STABILITY

The dimensional stability (size-change rate at 120° C.) of a foam according to the present invention is preferably 5 percent or less. If the dimensional stability is more than 5 percent, foam shrinkage is so great that products in which the inclusion of a heat-process method is essential cannot be obtained.

COMPRESSIVE HARDNESS AND STRESS

The 25%-compressive hardness of the foam according to the present invention preferably ranges from 0.1 to 1.0 kg/cm$^2$ at ordinary temperatures. If the compressive hardness is more than 1.0 kg/cm$^2$, the tensile strength of foam becomes so great that its tactility deteriorates. If the compressive hardness is lower than 0.1 kg/cm$^2$, the foam becomes so soft that a "reaching-bottom feeling" results (i.e., a feeling of reaching the opposite surface when the foam is pressed by a finger). Furthermore, foam of weak tensile strength deteriorates handling characteristics in manufacturing and transforming processes.

The 5%-tensile stress of the foam according to the present invention may range from 10 to 100 kg/cm$^2$ at ordinary temperature. If the stress is more than 100 kg/cm$^2$, the shock absorbing ability deteriorates and the tensile strength becomes too great. If the stress is lower than 10 kg/cm$^2$, the tensile strength becomes too weak, although the flexibility is adequate.

The 25%-compressive hardness and the 5%-tensile stress at ordinary temperature may be used as a measure of suppleness flexibility. Foams of which characteristics are within the above ranges will have suppleness noticeably different from those of conventional foams, when such foams are evaluated after they are laminated with various kinds of facing material and processed to form products.

SHEET

The foam according to the present invention is a sheet. The foam may be more than 10 m long, and may be rolled in forming a material product. The long sheet may be processed in several continuous manufacturing steps in order to decrease losses during the steps.

MANUFACTURING STEPS

A method for manufacturing a foam according to the present invention will henceforth be described.

The resin components (A), (B) and (C), powdered into 32-mesh-passing size, are provided, of which proportions are within the ranges of the present invention. The components are fed into a high-speed mixing apparatus (such as a Henschel mixer or a super mixer). Furthermore, an ordinary chemical foaming agent of the decomposable type (for example, azodicarbonamide, dinitrosopentamethylene-tetramine, etc.) of 2 to 20 parts by weight is added to the resin components of 100 parts by weight. At the same time, other additives may also be included. Thereby, initial mixing is carried out. The obtained material is fed into an extruder heated at 130° to 190° C., and melt-diffusion mixing is effected, producing a long sheet which is 0.5 to 6 mm in thickness. In the mixing steps, it is important that the forming agent be decomposed as little as possible.

The obtained sheet must be cured in order not to allow interior gas generated by the decomposition of the foaming agent to escape during the foaming process. In order to cure the sheet, a conventional ionizing radiation method may be used. A conventional peroxide compound can be added prior to irradiation; furthermore, if desired, a multi-functional monomer of divinylbenzene, trimethylolpropane triacrylate, pentaerythritol triacrylate, etc.; a multi functional dimer of those; or a multi functional trimer of those may be added as a crosslinking promoting agent. Added within the scope of the present invention may be an inorganic filler such as calcium carbonate, talc, glass balloon, glass fiber, etc.; an antistatic agent; a flame retarder; and a colorant.

The obtained cured sheet is introduced into a heated-air atmosphere or onto a chemical liquid such as silicon oil, of which temperature is 10° to 100° C. higher than the decomposing temperature of the foaming agent, whereby the foaming agent is rapidly decomposed to make the sheet-type cured foam.

If a corona discharging process is applied to at least one surface of the obtained foam, whereby the surface-wetting tension is more than 37 dyne/cm, the foam will be sufficiently adhesive to coating materials. A foam having an adhesive layer, or a cohesive layer formed of a coating material, can be laminated with a sheet of facing material, a film, another kind of foam, a metallic foil, a sheet of paper, a piece of nonwoven fabric made of natural fiber or synthetic fiber, or a piece of synthetic leather. The obtained laminated product can be molded by various methods.

PARAMETERS

The parameters will be explained in the following:

(a) Melting Point (°C.)

The melting point is a temperature at the highest peak of endothermic peaks in measurement with a differential spectrum calorimeter (DSC).

(b) Density ($g/cm^3$)

The density is measured in accordance with JISK6767.

(c) Gel Percent (%)

The foam to be measured is broken into small pieces, and 0.2 g pieces of the foam are selected by accurate weighing. The weighed pieces are soaked in tetralin at 135° C. for 2 hours, to elute soluble substances. Then, the insoluble part is taken out from the tetralin, and the tetralin remaining in the insoluble part is removed by acetone. The acetone is removed by hot water at 40° C. The insoluble part is then dried in a vacuum drier at 100° C. for 1 hour, and the weight $w1(g)$ of the insoluble part is measured. The gel percent (%) is calculated by the following formula, wherein 10 pieces of the foam should be used.

$$\text{Gel Percent } (\%) = (w1/0.2) \times 100$$

(d) Expansion Rate

A 10×10-cm piece is taken from a sheet-type foam. The piece is measured with respect to its thickness $t$ (cm) and its weight $w2$ (g). The expansion rate is calculated by the following formula, wherein 10 sample pieces are used.

$$\text{Expansion Rate} = 1/(w2/[10 \times 10 \times t])$$

(e) Tensile Strength at 150° C. ($kg/cm^2.\%$)

A 1×10-cm piece is taken from a sheet-type foam, and measured with respect to its thickness $t(cm)$. The piece of foam is set between chucks in a tensilon-type tensile tester within a heat box at 150° C. The distance between the chucks is 5 cm. The piece of foam is protected by paper or the like at the chucked portions, so that it will not be fractured at those portions. 5 minutes after the piece is set in the heat box, the piece is stretched at a tensile speed of 200 mm/min. The rupture stress $s1(kg)$ and the rupture extension $s2(cm)$ are recorded on a sheet of record paper.

The tensile strength at 150° C. ($kg/cm^2.\%$) can be calculated by the following formula, wherein 5 pieces of foam are used.

$$\text{Rupture Strength } (kg/cm^2) = s1/(1 \times t) \qquad (1)$$

$$\text{Rupture Elongation } (\%) = s2/5 \times 100 \qquad (2)$$

$$\text{Tensile Strength at 150° C. } (kg/cm^2 \cdot \%) = (1) \times (2)$$

where $s1$ is 0.3 $kg/cm^2$ or more, $s2$ is 100% or more.

(f) Size-Change Rate at 120° C. (Dimensional Stability) (%)

A 10×10-cm piece is taken from a sheet-type foam, and measured in thickness $t(mm)$ at the center. The piece is heated for 1 hour in a hot air drier at 120° C.

Subsequently, the piece is left for 2 hours at room temperature, and then its size is measured. The 120° C.-Size-Change rate (%) can be calculated by the following formula.

$$120° \text{ C.-Size-Change Rate } (\%)_{MD} = (10 - X_{MD})/10 \times 100$$
$$120° \text{ C.-Size-Change Rate } (\%)_{TD} = (10 - X_{TD})/10 \times 100$$

where TD signifies the lengthwise direction, MD signifies the widthwise direction.

(g) 25% Compressive Hardness at Ordinary Temperature (kg/cm$^2$)

The Compressive Hardness is measured in accordance with JIS K-6767.

(h) 5% Expansion Stress at Ordinary Temperature (kg/cm$^2$)

A 1×10-cm piece is taken from a sheet-type foam, and its thickness t(cm) is measured. The piece is set between chucks separated by a distance of 5 cm in a tensilon-type tensile tester, and stretched at 20 mm/min. The changes of stress and elongation are recorded on a sheet of paper, and then the stress s1 (kg) of the piece is measured when it has been stretched five percent. The 5%-expansion stress at ordinary temperature is calculated by the following formula.

$$5\%\text{-expansion Stress (kg/cm}^2) \text{ at ordinary temperature} = s1/(1 \times t)$$

(i) Molding Processability (L/D)

Cylindrical metal molds of which the depth (L)/diameter(D) ratio varies at intervals of 0.05 are used. A foam or laminated sheet is vacuum-molded at 160° to 180° C. by a vacuum molding machine. The maximum ratio at which the foam forms a molding without any breaks is determined as the value of molding processability.

$$\text{Molding Processability } (L/D) = L/D$$

EXAMPLES

Tables 1A and 1B show the resin composition, the mixing ratio, the curing methods and the characteristics of the foams according to the present invention. In the tables, "random" means random copolymer, "block" means block copolymer, and "homo" means homo polymer. "EPC" means propylene/ethylene copolymer, "BPC" means propylene/butane copolymer, "EEA" means ethylene/ethylacrylate, "EVA" means ethylene/vinylacetate copolymer, and "EEA.MAH" means (ethylene/ethylacrylate/maleicacid-anhydride) terpolymer. "Et-Bt" of ethylene/α-olefin copolymer means a copolymer formed by the polymerization of ethylene with butane as an α-olefin. The low-density polyethylene is made by the high pressure method, and the high-density polyethylene is made by the low pressure method. The linear very-low-density polyethylene is a polyethylene of which density is 0.910 g/cm$^3$ or lower, and which is made by the high-pressure ion polymerization method and the intermediate-low-pressure solution polymerization method.

Examples according to the present invention and comparative examples will henceforth be described.

One-hundred-fifty-kg mixtures of the resin components, a foaming agent, and other additives were each fed into a 500-litter Henschel mill. Each portion of the obtained mixed material was fed into an extruder of which cylinder temperature was 170° to 180° C. to carry out melt-mixing, whereby a long sheet of 1.5 mm thickness and 500 mm width was formed. The long sheet was set in an electron-beam irradiating device, and then it was cured with 2 to 10 Mrad electron-beam radiation. The obtained foamable cured sheet was introduced uniformly onto silicon oil of which temperature ranges from 210° to 240° C., thereby foaming the sheet. The foamed sheet was dried by hot air, whereby a sheet-type cured foam was obtained. The obtained foams ranged from 2.5 to 3.5 mm in thickness and from 950 to 1100 mm in width. The foams according to the present invention, as shown in Table 1B, had high degrees of flexibility, tensile strength, dimensional stability and molding processability, since the resin components, the mixing ratio, the curing method and the cross-linking density were chosen appropriately. Particularly, 25%-compressive hardness and 5%-expansion stress as parameters of flexibility were superior, so that the obtained flexible foams had a good tactility. Furthermore, the obtained foams had a tensile strength at high temperature which had not been achieved by conventional foams.

Tables 2A and 2B show the resin component, the mixing ratio, the curing method and the characteristics of the obtained foams with regard to comparative examples. The comparative examples were cured by the electron-beam curing method in the same manner as in the examples according to the present invention, or in the curing method with peroxide compounds, and foamed in the same way as in the examples according to the present invention.

Comparative examples 1 to 3 were made of ethylene/α-olefin copolymer. As shown in Table 2B, the comparative examples were inferior, at least in terms of flexibility, tensile strength and dimensional stability, since the resin components, the mixing ratio and the curing method were apart from the scope of the present invention. In particular, the comparative examples were much inferior in terms of tensile strength at high temperature and 120° C. size-change rate. Comparative examples 4 to 7 were made of linear very-low-density polyethylene (EXCELEN). As shown in Table 2B, the comparative examples were inferior, at least in terms of flexibility, tensile strength and dimensional stability, since the resin components, the mixing ratio and the curing method were apart from the scope of the present invention. Comparative examples 4 to 7, as well as Comparative examples 1 to 3, were noticeably inferior to the examples according to the present invention in terms of tensile strength at high temperature and 120° C. size-change rate. In the tables, the parts marked by an asterisk are apart from the scope of the present invention.

As which have been described above, the foams according to the present invention are superior in terms of flexibility, or tactility in particular. A high degree of molding processability can be obtained in accordance with the present invention, because the foams have a high degree of tensile strength, particularly at high temperatures. Furthermore, the foams according to the present invention also have sufficient dimensional stability, whereby they may be suitable as a damping material, for application to the doors, the ceiling, the instrument panel, etc. of automobiles interiors. The foams according to the present invention can be also applied to the base material of heat-resist adhesive tape, the base material of packagings, and heat-resisting and heat-insulate molding products, including various kinds of valves and pipes, etc., by virtue of the above characteristics.

TABLE 1A

| | RESIN COMPONENT | | | CROSS LINKING AGENT/ | | MIXING RATIO | | | GEL |
|---|---|---|---|---|---|---|---|---|---|
| EXAMPLE | (A) PP | (B) ETHYLENE COPOLYMER | (C) ETHYLENE/ α-OLEFIN COPOLYMER | FOAMING AGENT | CURING | A wt % | B wt % | C wt % | PERCENT (%) |
| 1 | RANDOM EPC Et 5% MI 2 | EEA EA 18% MI 7 | Et-Bt MI 5 DENSITY 0.907 MELTING POINT 120° C. | —/ AC 10% | ELECTRON BEAM | 100 | 17 | 50 | 38 |
| 2 | RANDOM EPC Et 13% MI 2 | EEA EA 8% MI 7 | Et-Bt MI 5 DENSITY 0.919 MELTING POINT 123° C. | —/ AC 12% | ELECTRON BEAM | 100 | 6.5 | 19 | 40 |
| 3 | RANDOM EPC Et 13% MI 2 | EEA.MAH EA.MAH 18% | Et-Bt MI 5 DENSITY 0.905 MELTING POINT 119° C. | —/ AC 8% | ELECTRON BEAM | 100 | 15 | 20 | 30 |
| 4 | RANDOM EPC Et 15% MI 4 | EVA VA 14% | Et-Bt MI 5 DENSITY 0.897 MELTING POINT 119° C. | —/ AC 13% | ELECTRON BEAM | 100 | 40 | 40 | 35 |
| 5 | HOMO PP — | EEA EA 8% MI 7 | Et-Bt MI 5 DENSITY 0.890 MELTING POINT 117° C. | —/ AC 13% | ELECTRON BEAM | 100 | 20 | 80 | 35 |

TABLE 1B

| | | FLEXIBILITY | | TENSILE STRENGTH | | MOLDING PROCES- SABILITY (L/D) | DIMENSIONAL STABILITY 120° C. SIZE-CHANGE RATE (%) | | |
|---|---|---|---|---|---|---|---|---|---|
| EXAMPLE | FOAMING RATE (%) | COMPRES- SIVE HARDNESS kg/cm² | 5% EXPANSION STRESS kg/cm² | ORDINARY TEMP. kg/cm² · % | 150° C. kg/cm² · % | | MD | TD | ZD |
| 1 | 20 | 0.48 | 60 | 4200 | 55 (STRENGTH 0.3 kg/cm² ELONGATION 180%) | 0.76 | −3.2 | −2.1 | 4.0 |
| 2 | 25 | 0.40 | 50 | 3800 | 60 (STRENGTH 0.3 kg/cm² ELONGATION 200%) | 0.85 | −2.8 | −1.9 | 3.1 |
| 3 | 15 | 0.96 | 95 | 1400 | 147 (STRENGTH 0.6 kg/cm² ELONGATION 245%) | 0.95 | −2.1 | −1.1 | 2.8 |
| 4 | 25 | 0.57 | 25 | 2500 | 90 (STRENGTH 0.45 kg/cm² ELONGATION 200%) | 0.62 | −3.5 | −2.7 | 4.6 |
| 5 | 25 | 0.68 | 75 | 9600 | 70 (STRENGTH 0.35 kg/cm² ELONGATION 200%) | 0.88 | −0 | −0 | 0 |

TABLE 2A

| COMPARATIVE EXAMPLE | RESIN COMPONENT PP | RESIN COMPONENT ETHYLENE COPOLYMER | RESIN COMPONENT ETHYLENE/α-OLEFIN COPOLYMER | CROSS LINKING AGENT/ FOAMING AGENT | CURING | MIXING RATIO A wt % | MIXING RATIO B wt % | MIXING RATIO C wt % | GEL PERCENT (%) | FOAMING RATE (%) |
|---|---|---|---|---|---|---|---|---|---|---|
| 1 | — | — | Et-Bt MI 2 DENSITY 0.907 MELTING POINT 121° C. | DCP 0.8%/ AC 13% | HEATING | — | — | 100 | 60 | 25 |
| 2 | RANDOM EPC Et 5% MI 2 | — | Et-Bt MI 2 DENSITY 0.905 MELTING POINT 120° C. | DCP 0.8%/ AC 7% | HEATING | 100 | — | 230 | 50 | 8 |
| 3 | RANDOM EPC Et 5% MI 2 | EEA EA 18% MI 7 | Et-Bt MI 5 DENSITY 0.900 MELTING POINT 119° C. | DCP 0.8%/ AC 10% | HEATING | 100 | 30 | 100 | 55 | 20 |
| 4 | LOW-DENSITY POLYETHYLENE MI 14 DENSITY 0.921 | — | EXCELEN MI 10 DENSITY 0.900 MELTING POINT 115° C. | —/ AC 6% | ELECTRON BEAM | 100 | — | 100 | 28 | 15 |
| 5 | RANDOM EPC Et 5% MI 2 | HIGH-DENSITY POLYETHYLENE MI 6.5 DENSITY 0.957 | EXCELEN MI 10 DENSITY 0.890 MELTING POINT 114° C. | —/ AC 13% | ELECTRON BEAM | 100 | 85 | 100 | 50 | 30 |
| 6 | RANDOM EPC Et 5% MI 2 | EEA EA 18% MI 7 | EXCELEN MI 10 DENSITY 0.900 MELTING POINT 115° C. | —/ AC 10% | ELECTRON BEAM | 100 | 30 | 200 | 35 | 20 |
| 7 | RANDOM EPC Et 5% MI 2 | EVA VA 15% MI 7 | EXCELEN MI 10 DENSITY 0.895 MELTING POINT 113° C. | DCP 1.5%/ AC 18% | HEATING | 100 | 50 | 40 | 65 | 45 |

TABLE 2B

| COMPARATIVE EXAMPLE | FLEXIBILITY COMPRESSIVE HARDNESS kg/cm² | FLEXIBILITY 5% EXPANSION STRESS kg/cm² | TENSILE STRENGTH ORDINARY TEMP. kg/cm² | TENSILE STRENGTH 150° C. kg/cm² · % | MOLDING PROCESSABILITY (L/D) | DIMENSIONAL STABILITY 120° C. SIZE-CHANGE RATE (%) MD | DIMENSIONAL STABILITY 120° C. SIZE-CHANGE RATE (%) TD | DIMENSIONAL STABILITY 120° C. SIZE-CHANGE RATE (%) ZD |
|---|---|---|---|---|---|---|---|---|
| 1 | 0.40 | 4 | 600 | 13 (STRENGTH 0.1 kg/cm² ELONGATION 130%) | 0.55 | −25.0 | −22.9 | 35.8 |
| 2 | 1.55 | 25 | 4000 | 28 (STRENGTH 0.14 kg/cm² ELONGATION 200%) | 0.64 | −13.0 | −10.5 | 17.5 |
| 3 | 0.50 | 9 | 2800 | 42 (STRENGTH 0.21 kg/cm² ELONGATION 200%) | 0.60 | −15.0 | −14.3 | 16.8 |
| 4 | 0.48 | 13 | 2900 | 25 | 0.60 | −35.0 | −32.9 | −42.1 |

TABLE 2B-continued

| COMPARATIVE EXAMPLE | FLEXIBILITY | | TENSILE STRENGTH | | MOLDING PROCESSABILITY (L/D) | DIMENSIONAL STABILITY 120° C. SIZE-CHANGE RATE (%) | | |
|---|---|---|---|---|---|---|---|---|
| | COMPRESSIVE HARDNESS kg/cm² | 5% EXPANSION STRESS kg/cm² | ORDINARY TEMP. kg/cm² | 150° C. kg/cm² · % | | MD | TD | ZD |
| | | | | (STRENGTH 0.2 kg/cm² ELONGATION 125%) * | | * | * | * |
| 5 | 0.65 | 105 * | 5800 | 45 (STRENGTH 0.25 kg/cm² ELONGATION 180%) * | 0.55 | −3.1 | −2.4 | 4.0 |
| 6 | 0.48 | 20 | 3100 | 32 (STRENGTH 0.16 kg/cm² ELONGATION 200%) * | 0.60 | −13.0 * | −10.3 * | 19.8 * |
| 7 | 0.08 * | 30.5 | 2500 | 45 (STRENGTH 0.30 kg/cm² ELONGATION 150%) * | 0.35 | −8.5 * | −6.8 * | 9.9 * |

We claim:

1. An electron-beam cured sheet-type foam comprising 100 parts by weight of a polypropylene type resin (A) the main component of which is propylene; 5 to 40 parts by weight of a copolymer resin (B) which is made up of ethylene and at least one comonomer selected from the group consisting of acrylic acid, ethylacrylate, maleic acid anhydride and vinylacetate; and a copolymer resin (C) made up of ethylene and an alpha olefin containing 4 to 8 carbon atoms, having a melting point of 117° C. to 123° C. and a density of 0.890 g/cmg/cm³ to 0.910 g/cm³; which foam sheet has a gel content of 20 to 60 percent, an expansion ratio of 5 to 40 a toughness at 150° C. of 50 kg/cm² % or more, a size-change ratio at 120° C. of 5 percent or less, a 25%-compressive hardness at ordinary temperature of 0.1 to 1.0 kg/cm² and a 5%-expansion stress at ordinary temperature of 10 to 100 kg/cm².

2. A foam according to claim 1, wherein the parts by weight of said polypropylene type resin (A) is 100, the parts by weight of said copolymer (B) ranges from 5 to 25, and the parts by weight of said copolymer (C) ranges from 20 to 50.

3. A foam according to claim 2, wherein said copolymer (C) is a copolymer including an α-olefin of 4 to 6 carbons having a melting point of 117° to 123° C., and a density of 0.895 to 0.905 g/cm³.

4. A foam according to claim 3, wherein said copolymer (B) includes 5 to 30 weight percent of said comonomer.

5. A foam according to claim 4, wherein said copolymer (B) includes 8 to 25 weight percent of said comonomer.

6. A foam according to claim 5, wherein said copolymer (B) is one selected from the group consisting of a two component copolymer of ethylene/ethyl-acrylate copolymer, which contains 8 to 18 weight percent ethyl acrylate; and a three-component copolymer of ethylene/ethylacrylate/maleic-acid-anhydride, which contains 8 to 18 weight percent of ethyl acrylate and maleic acid anhydride in total.

7. A foam according to claim 6, wherein said polypropylene type resin (A) is a polymer selected from the group consisting of a propylene homo-polymer; and a random copolymer, block copolymer and random-/block copolymer, including propylene and at least one comonomer selected from the group consisting of ethylene and butene.

8. A foam according to claim 7, wherein said polypropylene type resin (A) is a copolymer containing propylene and 2 to 35 weight percent of a comonomer.

9. A foam according to claim 8, wherein said polypropylene type resin (A) is a copolymer containing 3 to 30 weight percent of said comonomer.

10. A foam according to claim 9, wherein said polypropylene type resin (A) is a random copolymer including 4 to 15 weight percent ethylene.

* * * * *